United States Patent [19]

Ho

[11] Patent Number: 5,680,505
[45] Date of Patent: Oct. 21, 1997

[54] RECOGNITION BASED ON WIND DIRECTION AND MAGNITUDE

[76] Inventor: Kit-fun Ho, P.O. Box 54504, North Point, Hong Kong

[21] Appl. No.: 715,750

[22] Filed: Sep. 19, 1996

Related U.S. Application Data

[63] Continuation of Ser. No. 273,778, Jul. 12, 1994, abandoned, which is a continuation of Ser. No. 104,407, Aug. 10, 1993, which is a continuation of Ser. No. 831,660, Feb. 7, 1992, which is a continuation of Ser. No. 410,824, Sep. 22, 1989.

[51] Int. Cl.$^6$ ........................................................ G10L 5/00
[52] U.S. Cl. ........................................... 395/2.6; 395/2.4
[58] Field of Search ................................. 395/2.4, 2.43, 395/2.5, 2.51, 2.6–2.66, 2.85

[56] References Cited

U.S. PATENT DOCUMENTS

| | | | |
|---|---|---|---|
| 4,277,644 | 7/1981 | Levinson | 395/2.5 |
| 4,335,276 | 6/1982 | Bull | 395/2.85 |

*Primary Examiner*—David D. Knepper

[57] ABSTRACT

A plurality of transducers are positioned in front of a speaker's mouth for detecting and responding to air flow patterns in space and time. Specific examples for the system and method for speech analysis and recognition by the detection of air flow pattern in the proximity of the mouth in space and time during an utterance are provided.

12 Claims, 6 Drawing Sheets

RECOGNITION BASED ON WIND DIRECTION AND MAGNITUDE

This is a continuation of application Ser. No. 08/273,778, filed 1994 Jul. 12, now abandoned, which is a continuation of application Ser. No. 08/104,407, filed 1993 Aug. 10, which is a continuation of application Ser. No. 07/831,660, filed 1992 Feb. 7, which is a continuation of application Ser. No. 07/410,824, filed 1989 Sep. 22.

BACKGROUND OF THE INVENTION

1. Field of the Invention

The present invention relates to the detection, analysis, and recognition of speech and is especially concerned with systems utilizing speech air flow, and, particularly concerned with positioning a plurality of transducers in front of a speaker's mouth for detecting and responding to air flow patterns in space and time.

2. Description of the Prior Art

Numerous systems for speech detection, analysis, and recognition and speech control have been proposed. See, for example, U.S. Pat. Nos. 4,718,096 issued to Meisel for "SPEECH RECOGNITION SYSTEM", 4,590,604 issued to Feilchenfeld for "VOICE-RECOGNITION ELEVATOR SECURITY SYSTEM", and 4,618,985 issued to Pfeiffer fop "SPEECH SYNTHESIZER", and U.K. Patent Application No. 2,087,617 A by Ichikawa et al. for "CONTINUOUS SPEECH RECOGNITION METHOD AND APPARATUS", and French Patent Application No. 2,559,325 by Dubus et al for speech capture apparatus.

SUMMARY OF THE INVENTION

The present invention is directed to a system and method for analysing and recognizing speech by air flow associated with air flow through the vocal chord during speech production.

Accordingly the present invention also provides a system and method for speech analysis and recognition by the detection of air flow pattern in the proximity of the mouth in space and time during an utterance.

The system and method of the present invention have advantage over the reference patents cited above that it may work with both audible and inaudible utterances.

In addition, existing speech recognition systems have difficulty in recognizing speech utterances which sound alike even though such utterances may have quite different air flow in the proximity of the mouth in space and time. The present invention has the advantage of being capable of identifying different speech sounds that sound alike whereas their air flow patterns are quite different. For example, many speech words that sound alike may begin with sexy, "b", "t", "d", "t", "p", "f", or "th", respectively, which have different air flow patterns and/or other air flow propertities in the space around the mouth when uttered. Of course, different air flow patterns may also be detected and identified in the middle portions of speech words that sound alike to the ear.

The system and method of the present invention also identifies inaudible rush of air out of or into the mouth during an utterance and between utterances.

Another advantage is that since the method of the present invention detects the air flow pattern around the mouth, it may differentiate between noises in the surrounding from the utterance picked up out of the mouth of a speaker.

The present invention has another advantage that it identifies the speech utterance out of the mouth of a speaker physically present in which case air flow pattern is detected and differentiates from speech utterance from a speaker at a distance in which case no air flow pattern is picked up.

An object of the present invention is to detect and utilize speech air flow, for example, for analysing and studying speech, for recognizing speech, and for accomplishing speech commands, etc.

Another object of the present invention is to provide a device for measuring speech air flow.

Another object of the present invention is to analyse speech by air flow properties.

Another object of the present invention is to recognize speech by air flow properties.

Another object of the present invention is to utilize speech air flow properties as speech commands.

Another object of the present invention is to provide a speech recognition system operable at high noise levels.

Another object of the present invention is to provide a speech control system operable at high noise levels.

Another object of the present invention is to provide means for extracting and analysing speech signals comprising analogues of speech air flow.

Another object of the present invention is to provide means for extracting speech features comprising air flow features.

Another object of the present invention is to provide a system wherein speech is defined by quantities comprising quantities representative of speech air flow properties.

Another object of the present invention is to provide a system wherein speech air flow properties are used to time the speed of a speech utterance.

Another object of the present invention is to provide a speech controlled system operable with softly uttered commands, such as whispered commands.

Another object of the present invention is to provide a system for distinguishing speech entered by a human speaker from backgroud sounds.

Another object of the present invention is to provide a system for utilizing the analogues of air flow quantities of speech.

Another object of the present invention is to utilize speech air flow quantities as means for measuring the speed of speech production.

Another object of the present invention is to detect plosive and fricative utterances.

Another object of the present invention is to provide a speech recognition system relatively immune to background noise sounds.

Another object of the present invention is to provide a system for responding to speech inputs, comprising a plurality of transducers mounted in front of a speaker's mouth to respond to air flow patterns with the output of the transducers being connected to a computer system or other responding subsystems.

Another object of the present invention is to provide a system for recognizing the emotion or manner with which speech is input, for example whether the input speech is spoken in a relaxed manner or a stressed manner.

Another object of the present invention is to provide a a headgear (e.g. a helmet) comprising a plurality of transducers mounted on the headgear for detecting and untilizing speech air flow from the mouth of a speaker wearing said headgear.

Further objects and advantages of my invention will become apparent from a consideration of the drawings and ensuing description of it.

The same system and method of the present invention, together with the advantages thereof, may best be understood by reference to the following description taken in connection with the accompanying drawings, in the several figures of which, like reference numerals identify like elements.

DESCRIPTION OF THE PREFERRED EMBODIMENTS

The principles of the present invention are capable of being applied with hardware and/or with software in a variety of manners, several of which, with variations, will be described herein.

Figure 1A:
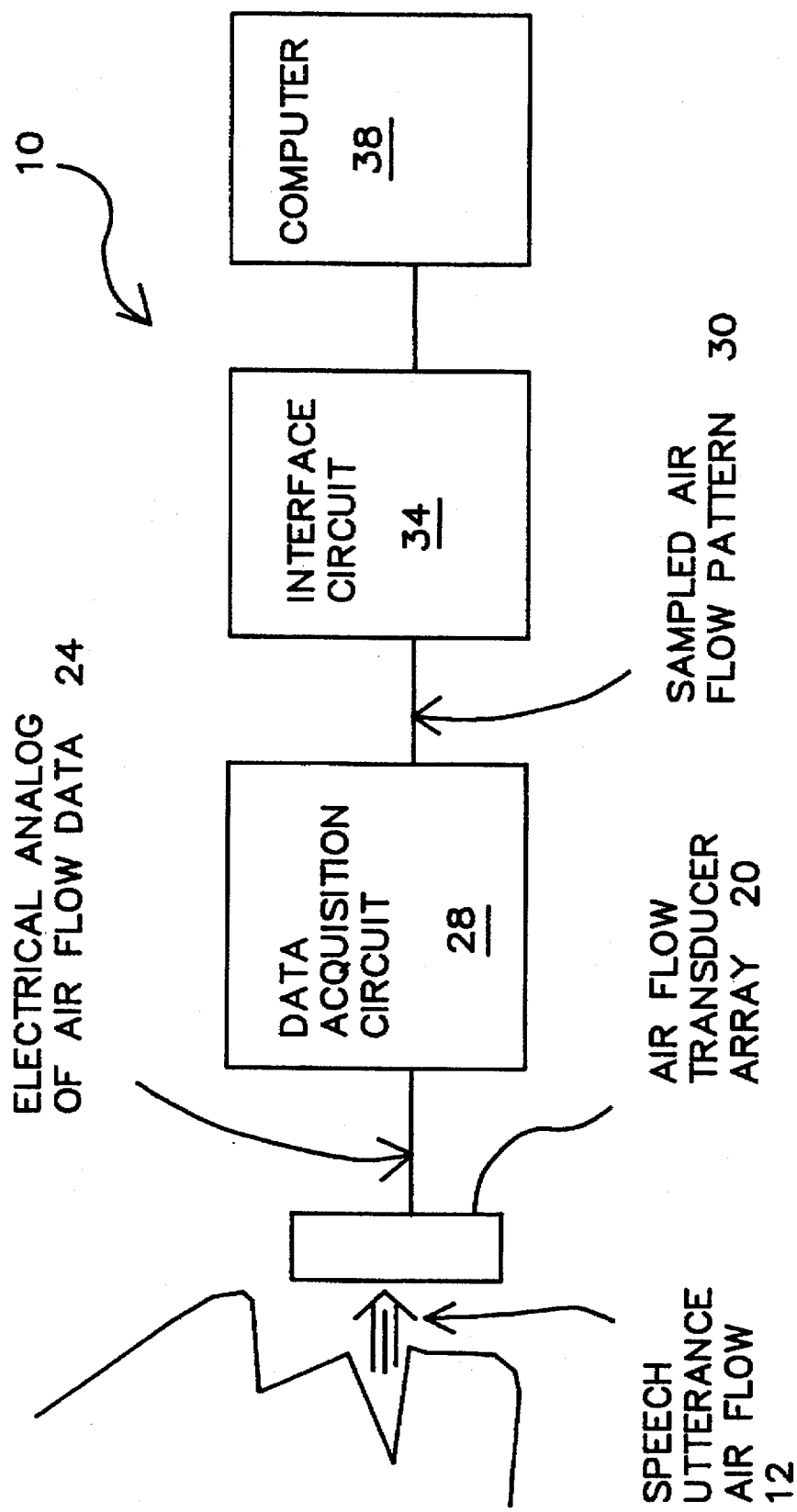
FIG. 1A is a block diagram of a system constructed in accordance with the teachings of the present invention.
Figure 1B:
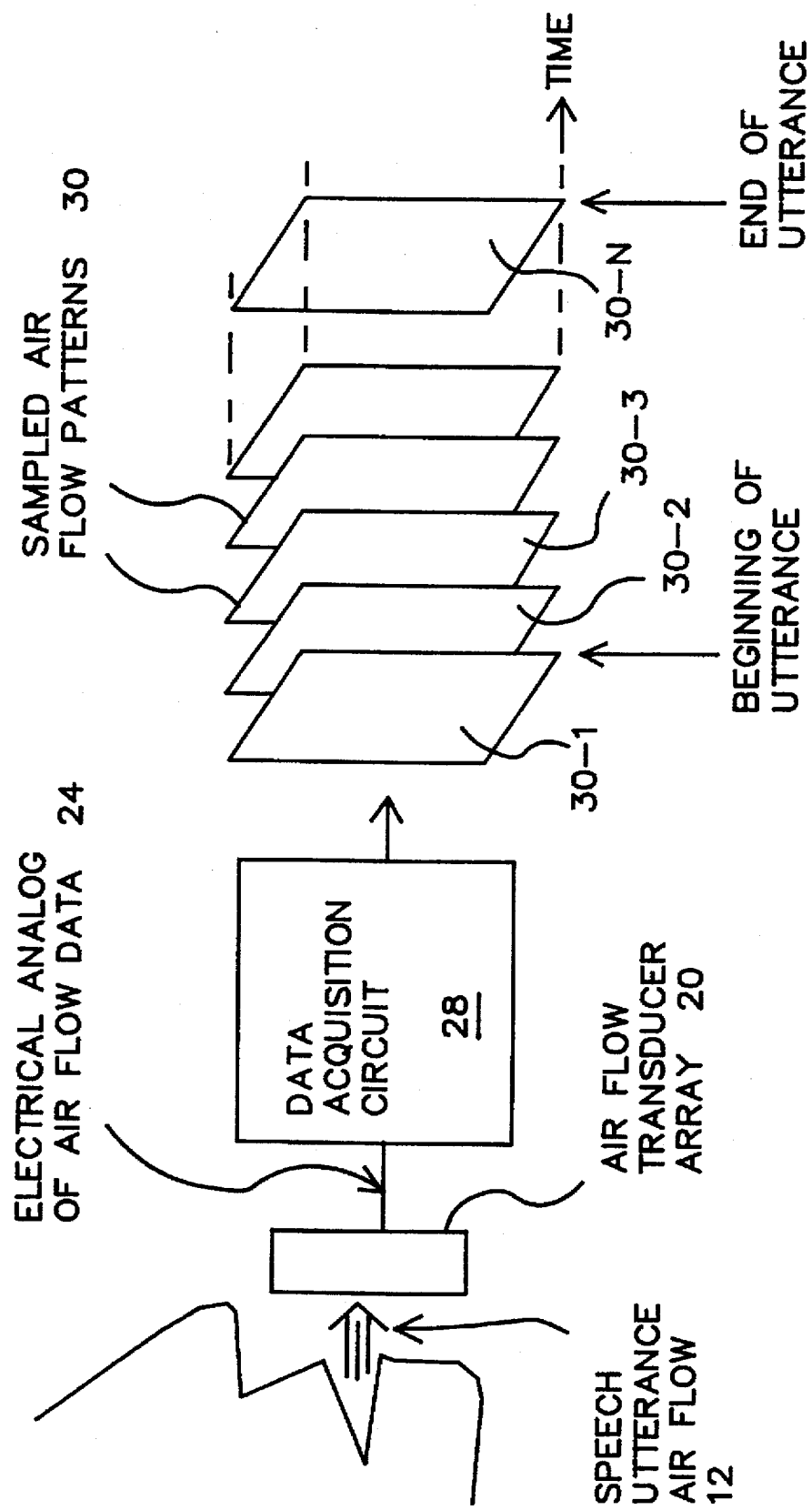
FIG. 1B is a diagram relating to a time series of sampled air flow patterns illustrative of the operation of the invention.

A system constructed in accordance with the present invention is shown in FIGS. 1A and 1B and is generally identified thereinby reference numeral 10. The system 10 is responsive to speech utterance air flow 12 input to the system. The system 10 includes an air flow transducer array 20 positioned in front of a speaker's mouth and fixed in position relative to the speaker's head. Generally the transducer array 20 comprises more than one transducer element located at different points in space. Upon a specific speech utterance input from the speaker the transducer array 20 produces electrical outputs in response to and reprsentative of the speech utterance air flow 12 detected at, in this case, more than one point in space in the vincinity of the speaker's mouth during the speech utterance. In this manner, the air flow transducer array 20 continuously outputs electrical analog of air flow data 24 which is fed to data acquisition circuit 28. The data acquisition circuit 28 serves to sample the electrical analog input data 24 and output in digital form a time series of the sampled air flow patterns 30 which represent a series of "snapshots" 30-1, 30-2, 30-3, ..., 30-N of the air flow patterns of the specific utterance. These electrical "snapshots" in digital form may be readily fed through an interface ciruit 34 to a digital computer 38. At the computer 38 these electrical "snapshots" patterns is analysed and recognized in the same general manner as in pattern recognition, which is a widely known and well developed art. Thus, in the same manner as in pattern recognition the computer 38 is programmed to (a) analyse the received "snapshot" patterns, i.e. the sampled air flow data associated with the speech utterance, (b) extract the air flow features, (c) match the extracted features with stored or pre-defined reference features of a vocablulary of utterances, and (d) identify the detected utterance, whereby the specific utterance may be recognized and its features may be displayed. The computer 38 may be additionally programmed to execute a command in accordance with the recognized utterance, whereby speech commands may be achieved.

Figure 2A:
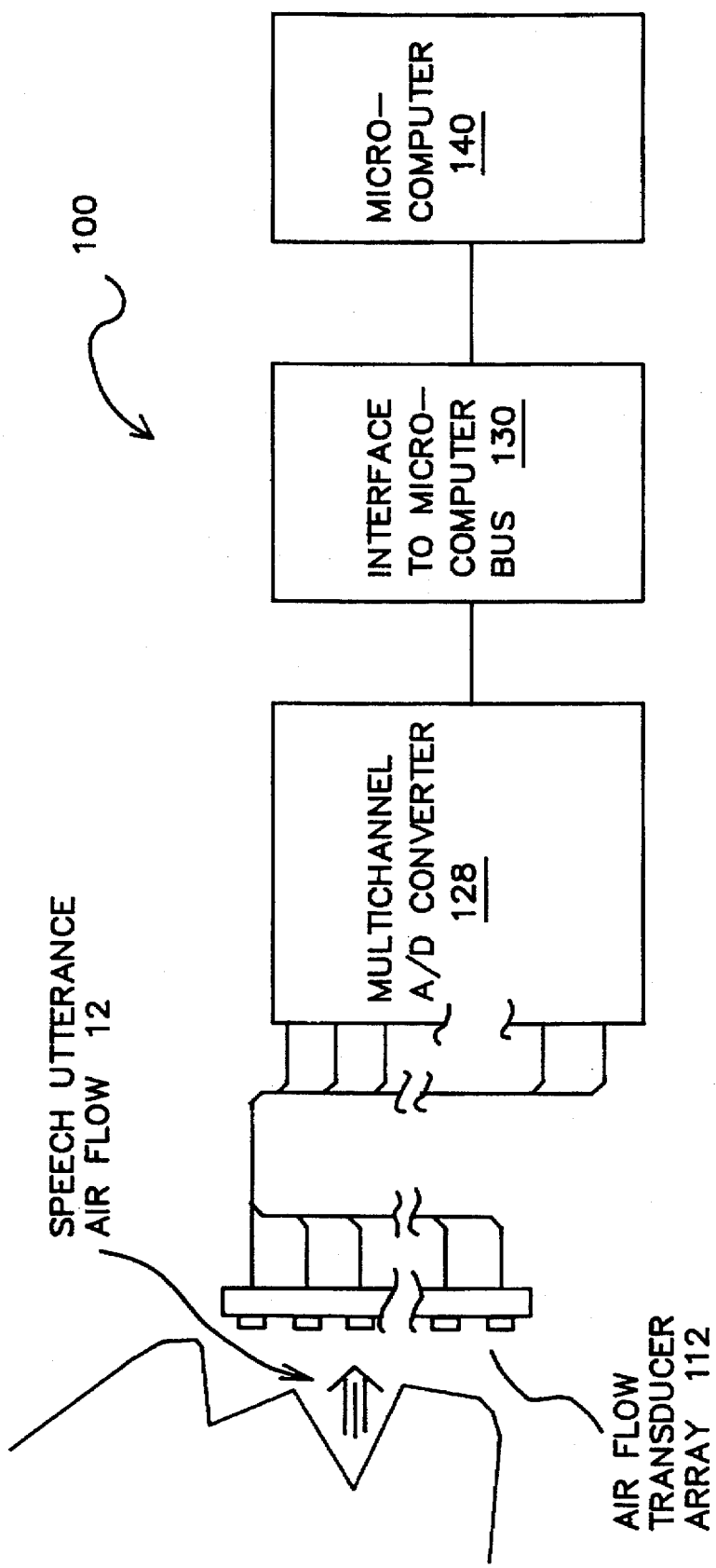
FIG. 2A is a block diagram of a more specific system constructed in accordance with the teachings of the present invention.
Figure 2B:
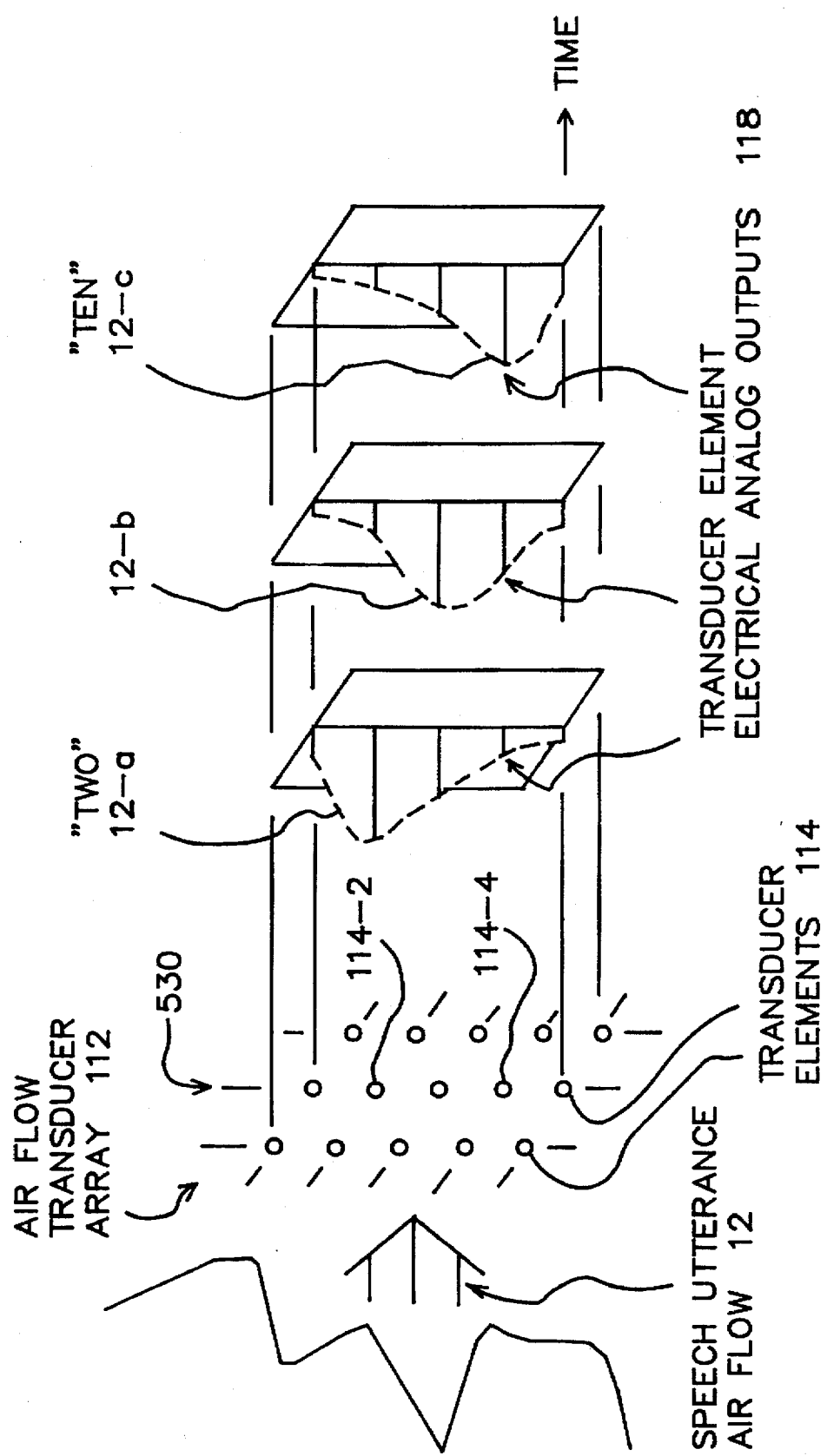
FIG. 2B is a diagram showing the structure of a specific transducer array of the present invention, which is responsive to a variety of air flow patterns of specific speech utterances illustrative of the operation of the invention.

In FIG.s 2A and 2B there is shown a more specific system 100 of the present invention. Speech utterance air flow 12 of a specific speech utterance such as "TWO" 12-a or "TEN" 12-c, etc. is detected with an air flow transducer array 112 which is positioned in front of a speaker's mouth and fixed in position relative to the speaker's head. The transducer array 112 is constructed with a number of transducer elements 114 including elements 114-2 and 114-4 arranged in a specific pattern, such as shown in FIG. 2B. The transducer array 112 is positioned close to and in front of the mouth of the speaker with element 114-2 at about 1 cm from the lips of the speaker, to pick up speech utterance air flow 12. The transducer element electrical analog outputs 118, representative of the speech utterance air flow 12, are fed to respective channels of a multichannel A/D converter 128, converted into digital form and then fed through an interface to microcomputer bus 130 to a microcomputer 140. In a specific embodiment the microcomputer 140 can be an APPLE II(trademark) microcomputer, and the multichannel A/D converter 128 and interface 130 may take the form of a commercially available multiplexed, multichannel, such as 16 channels, A/D converter board which alreadly includes suitable interfacing to the APPLE II(trademark) microcomputer. Again, the microcomputer 140 is programmed in the same manner as in pattern recognition to analyse the sampled air flow data detected with the speech utterance, to extract the air flow features, to compare the extracted features with stored or pre-defined reference features of a vocabulary of utterances, and to identify the detected utterance.

The system of the present invention may also be embodied in the form of a hybrid system which detects and operates with both the air flow patterns and the audible acoustic sounds of a specific speech utterance. More specifically, the system of the present invention may be embodied in the form of a system comprising a first subsystem to detect the air flow pattern of a speech utterance, and a second subsystem to detect the audible acoustic sounds of same speech utterance. The construction of the first subsystem may be similar to the system 10 of FIG. 1A. The second part may be similar to existing speech recognition systems which picks up with a microphone the audible acoustic sounds, i.e. the audible spectrum frequency components. The hybrid system may be programmed or hardwired such that an input speech utterance is declared recognized only if both subsystems identify same. In this manner, the embodiment of the hybrid system of the present invention has the advantage of being more discriminating than the systems of the references cited above, which systems only detect the audible sound components of speech utterance. This is achieved because the hybrid system of the present invention identifies and recognizes an extra dimension of speech utterance, namely the air flow components of speech utterance.

Figure 3A:
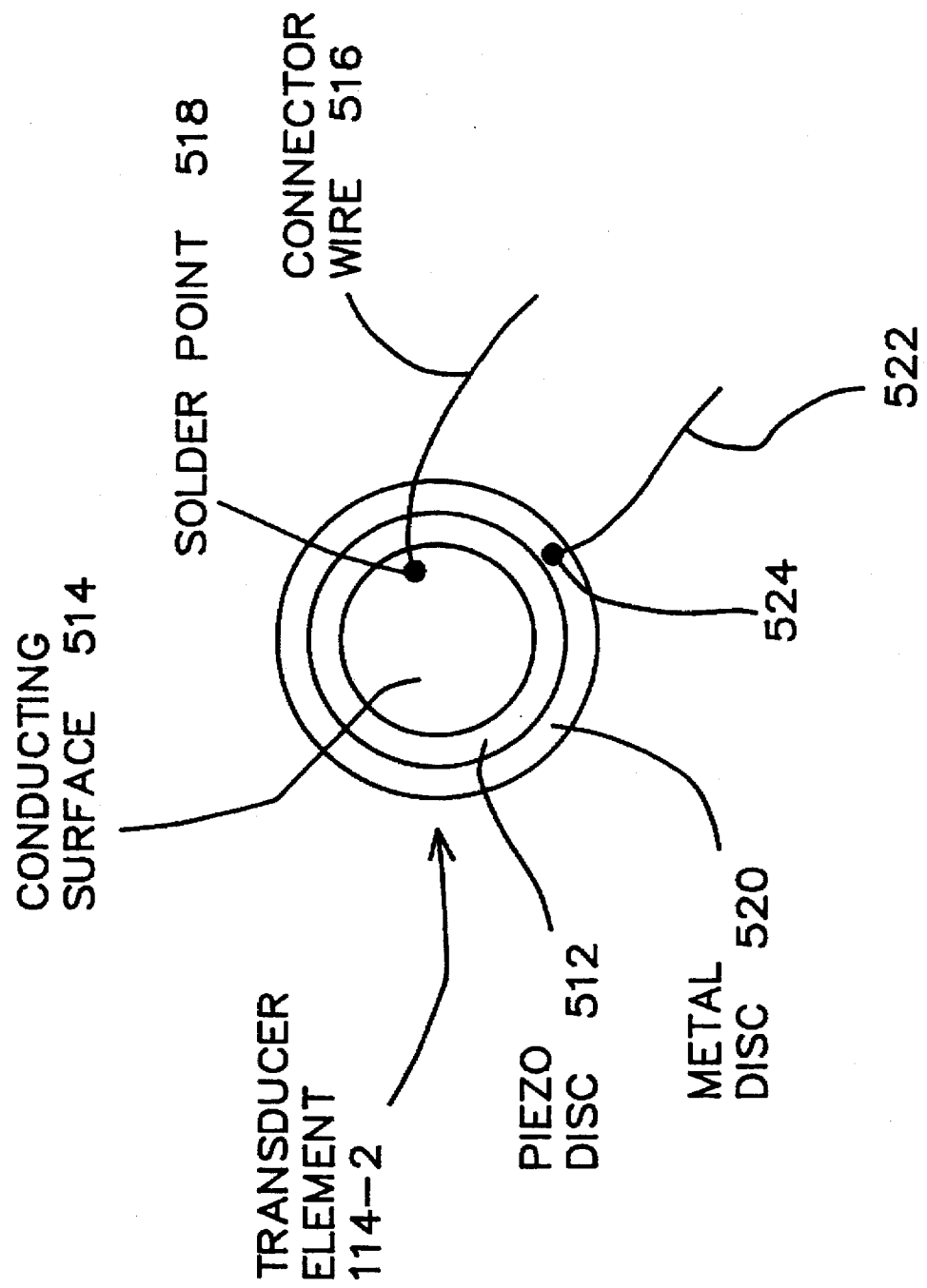
FIG. 3A is a diagram relating to the construction of tranducer elements.
Figure 3B:
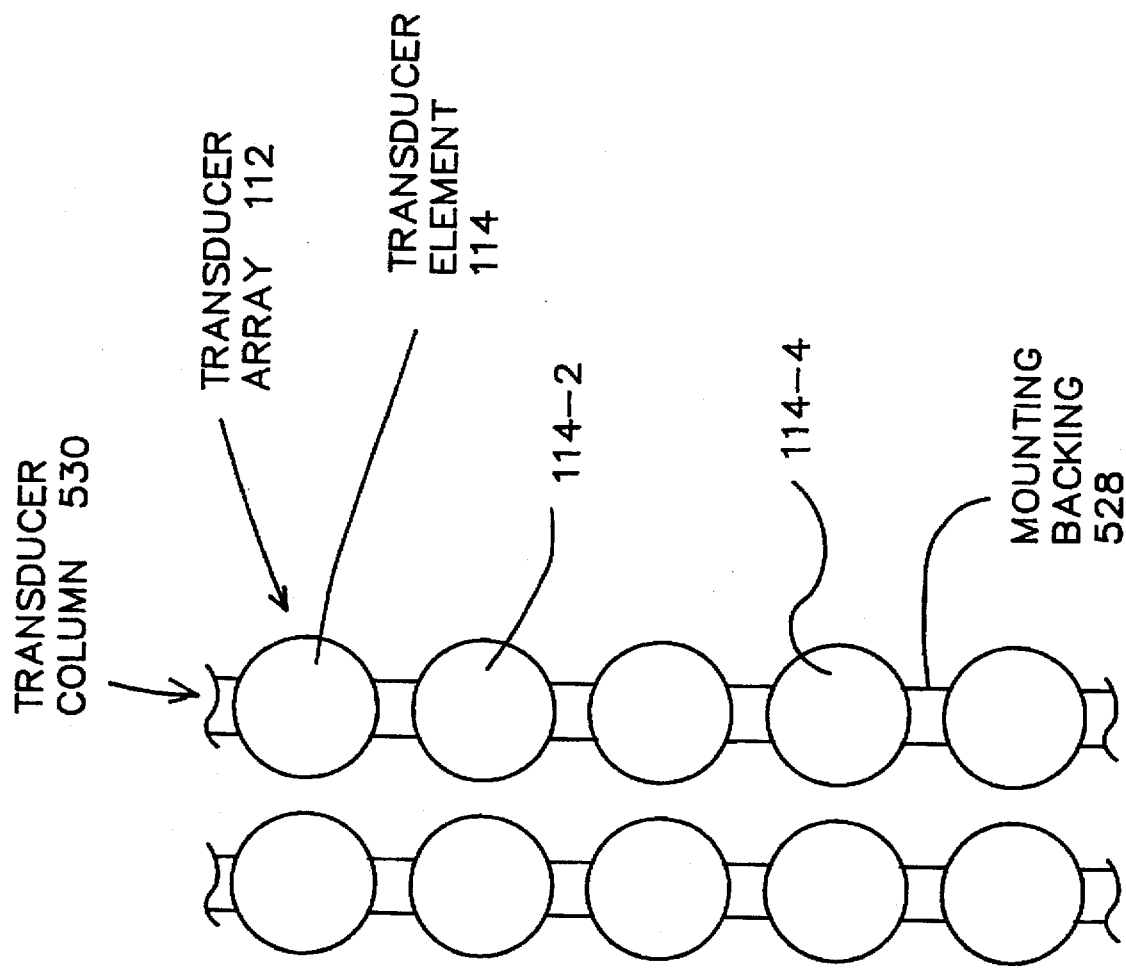
FIG. 3B is a diagram illustrative of the construction of transducer arrays.

As described above the transducer element of the present invention outputs an electrical analog representative of the air flow detected. The transducer elements 114 may be constructed in a manner similar to piezo sound discs, such as those used in buzzers and musical greeting cards. Referring to FIG. 3A, the transducer element 114-2 may be constructed with a piezo disc 512 having an exposed conducting surface 514 which is connected to a connector wire 516 at solder point 518. A similar conducting surface at the other side of the disc is adhered and electrically connected to a metal disc 520 which is connected to a connector wire 522 at solder point 524. In the prototype of a specific embodiment of the system of the present invention the transducer element 114-2 is constructed with a piezo disc 512 of 13 mm diameter, the conducting surface being 12 mm in diameter and the metal disc 520 being 15 mm in diameter. It worked very well in the prototype and it produces a peak voltage of more than 0.2 V when "TWO" is being spoken, while the transducer is fixed in a position such that referring to the speaker's closed lips the exposed surface 514 is directly facing the lips and at a distance of about 1 cm from the lips, the piezo disc 512 being so oriented that the exposed conducting surface is positive, i.e. of positive polarity with respect to the metal disc 512. Furthermore, by mounting transducers 114 along a rod or a bar or other similar mounting backing 528 as shown in FIG. 3B we may construct a transducer column 530. And grouping two or more columns as shown in FIG. 3B we may construct a transducer array 112. In the prototype the center-to-center distance between adjacent transducers in a column is about 16 mm and it works well.

Figure 4:
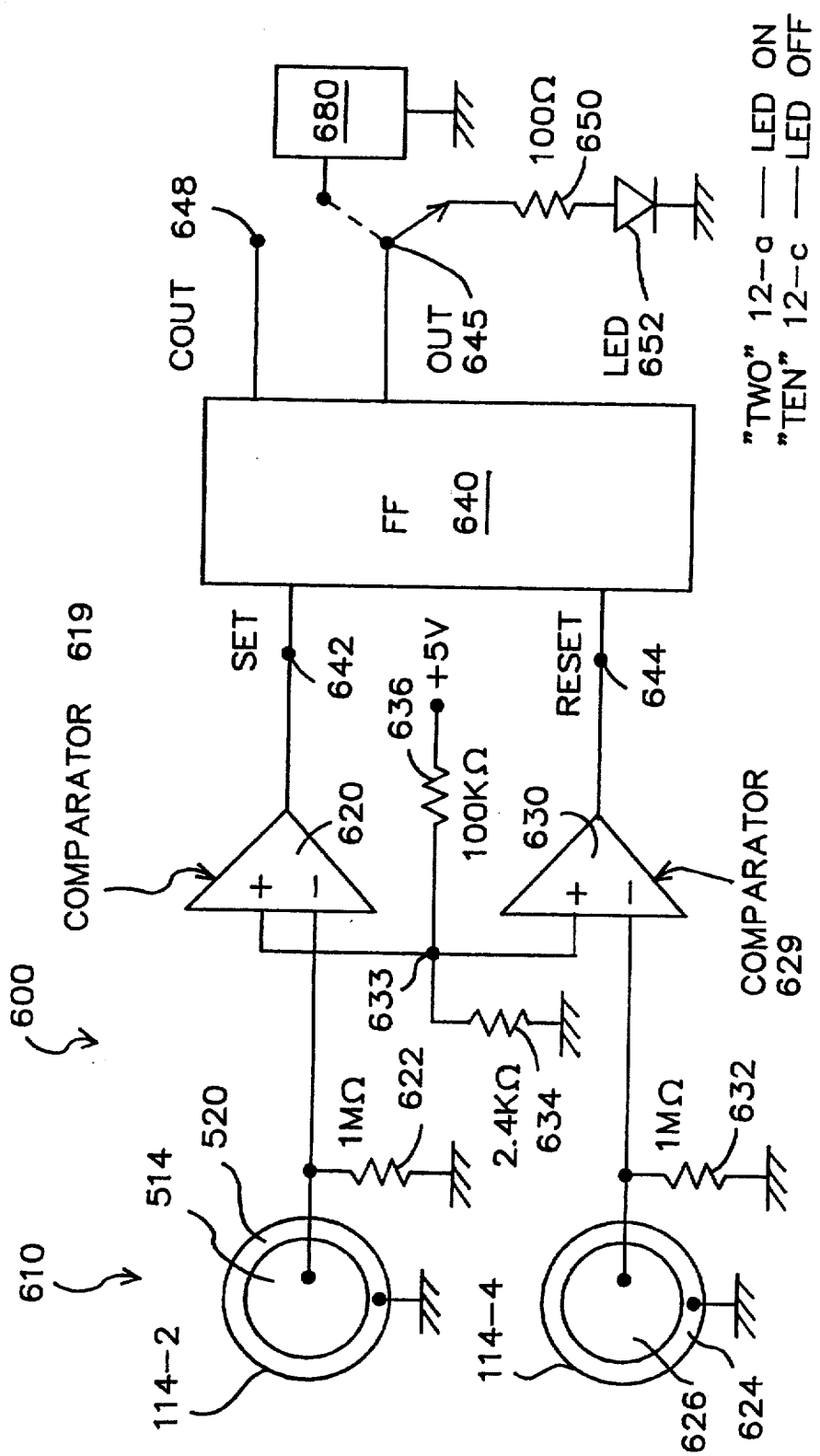
FIG. 4 is a circuit diagram for a system constructed in accordance with the teachings of the present invention.

Alternatively, the system and method of the present invention may be embodied in various manners. Referring to FIG. 4, there is shown another system 600 constructed in accordance with the present invention which is economical to construct and simple to use. The system 600 includes a transducer array 610 consisting of an upper transducer 114-2 having the same construction and dimensions as the specific transducer element 114-2 described earlier, and a identical lower transducer element 114-4 with metal disc 624 and exposed conducting surface 626. The center-to-center distance between the two transducers is about 31 mm. The position of array 610 is fixed with respect to the head of the speaker. Referring to the speaker's head in up right position with lips closed, the array is positioned vertically with the normal axis of the upper tranducer 114-2 pointing to the mid point of the line where the lips meet, and the upper transducer 114-2 is at a distance of about 1 cm from the lips. The upper transducer 114-2 has its metal disc 520 connected to chassis ground and its exposed conducting surface 514 connected to the negative input of a comparator 619 constructed with an operational amplifier 620, 514 being also connected to an input resistor 622 which is connected to chassis ground. The lower transducer 114-4 has its metal disc 624 connected to chassis ground and its exposed conducting surface 626 connected to the negative input of a comparator 629 constructed with an operational amplifier 630, 626 being also connected to an input resistor 632 which is connected to chassis ground. A potential divider is formed with series resistors 636 and 634, their common point being 633, 636 being connected to +5 V and 634 to chassis ground, i.e. 0 V. The positive inputs of both comparators 619 and 629 are connected to 633 at which Junction a reference voltage is provided to both comparators. Thus, if the upper transducer produces a positive voltage at 514 greater than the reference voltage then the output of comparator 619 will be LOW (i.e. about 0 V), otherwise it will be HIGH (i.e. about +5 V). Similarly, if the lower transducer produces a positive voltage at 626 greater than the reference voltage then the output of comparator 629 will be LOW (i.e. about 0 V), otherwise it will be HIGH (i.e. about +5 V). The system 600 includes a set-reset flip-flop 640 which has a set terminal SET 642, a reset terminal RESET 644, 642 being connected to the output of comparator 619 and 644 being connected to the output of comparator 629. The flip-flop 640 has an output terminal OUT 645 which is connected through current limiting resistor 650 to an LED 652 to chassis ground. The output at OUT 645 may also be coupled to turn on or off other apparatus 680. The flip-flop 640 also provides at terminal COUT 648 logical output complement to OUT 645.

In operation, the speaker may chose to speak "TWO" or "TEN" to turn the LED 652 or other apparatus 680 on or off, respectively. Namely, speaking "TWO", which has an air flow pattern like 12-a would produce speech air flow mainly directed at upper transducer 114-2 which produces a voltage surge greater than the reference voltage, causing the output of comparator 619 to LOW, which switches OUT 645 of the flip-flop 640 to stay at HIGH, i.e. switching on. Similarly, speaking "TEN", which has an air flow pattern like 12-c would produce speech air flow mainly directed at lower transducer 114-4 which produces a voltage surge greater than the reference voltage, causing the output of comparator 629 to LOW, which switches OUT 645 of the flip-flop 640 to stay at LOW, i.e. switching off.

The system and method of the present invention is not limited to a particular language. For example, in a similar manner as described above, we may choose to switch the output of the system 600 at OUT 645 on or off by speaking in Cantonese the Chinese charaters identified by Chinese telegragh codes 5897 and 0255, repectively. This embodiment is especially easy to use because the former character means "rush foward", and the latter meaning "halt". This is especially useful when the output at OUT 645 is employed to drive apparatus relating to physical movements.

From the foregoing description, it will be apparent that the system of the present invention provides a method and system for recognizing and utilizing speech air flow which has advantages over the prior art.

While several embodiments of the system of the invention have been shown and described, changes and modifications may be made to the system without departing from the teaching of the invention and, therefore, the invention is only to be limited as necessitated by the accompanying claims.

I claim:

1. A system for recognizing speech utterances having local wind content, comprising:
   (a) converting means comprising transducer means responsive to said content for converting the aerodynamic wind of an input speech utterance emanating from the speaker to an electrical output dependent on said aerodynamic wind, said output varies with said aerodynamic wind; and
   (b) means coupled to said output for producing one of a plurality of different specific responses dependent on said output, whereby identifying one of a plurality of utterances according to said content of said input speech utterance.

2. The system of claim 1, wherein said output of said converting means varies with the aerodynamic velocity profile of said aerodynamic wind.

3. The system of claim 1, wherein said output of said converting means varies with the direction of said aerodynamic wind referring to said speaker's head position.

4. The system of claim 1, wherein said transducer means comprising wind pressure transducer means for converting said aerodynamic wind of said speech utterance to said electrical output.

5. The system of claim 1, wherein said transducer means comprising a plurality of wind transducer elements for converting said aerodynamic wind of said speech utterance to said electrical output.

6. A speech command system, comprising
    (a) first means comprising transducer means for converting the aerodynamic wind of a speech command emanating from a speaker to electrical signals which vary with the flux of said aerodynamic wind, said electrical signals being varied for a plurality of speech commands;
    (b) second means coupled to said electrical signals for determining a specific response according to pre-defined logic.

7. The speech command system of claim 6, wherein said second means for determining said specific response according to said pre-defined logic comprising logic decision circuit means coupled to said electrical signals.

8. A method for recognising speech having aerodynamic wind content, comprising steps of:
    (a) sensing the aerodynamic wind of a speech utterance emanating from the speaker thereof and generating a corresponding electrical output, said electrical output varies with the aerodynamics of said wind; and
    (b) identifying one of a plurality of speech utterances according to said electrical output.

9. A method for achieving at least two speech commands, comprising steps of:
    (a) converting the flux of the aerodynamic wind of a speech command to electrical signals which vary with said flux;
    (b) producing one of a plurality of specific responses to said electrical signals according to pre-defined logic.

10. A speech recognizer, comprising:
    (a) sensing means comprising a plurality of transducer elements for sensing the wind strengths of the aerodynamic wind of a speech utterance at a plurality of locations;
    (b) means coupled to said transducer elements for distinguishing at least two speech utterances according to pre-defined logic.

11. Apparatus responsive to the aerodynamic wind of speech inputs, comprising
    (a) transducer means for sensing the aerodynamic wind of speech production emanating from the mouth of a speaker; and
    (b) responding means coupled to said transducer means for selecting a response to said speech production according to the specific output of said transducer means.

12. The apparatus of claim 11, wherein said responding means comprising logic means for selecting said response to said speech production.

* * * * *

UNITED STATES PATENT AND TRADEMARK OFFICE
CERTIFICATE OF CORRECTION

PATENT NO.  : 5,680,505           Page 1 of 2
DATED       : 10/21/97
INVENTOR(S) : KIT-FUN HO It is certified that error appears in the above-identified patent and that said Letters Patent is hereby corrected as shown below:

```
Drawings              insert sheet 7 of 7, Fig. 4
Title, page           delete "6 Drawing"  insert --7 Drawing--
Drawg. sheet 1        delete "1 of 6"     insert --1 of 7--
Drawg. sheet 2        delete "2 of 6"     insert --2 of 7--
Drawg. sheet 3        delete "3 of 6"     insert --3 of 7--
Drawg. sheet 4        delete "4 of 6"     insert --4 of 7--
Drawg. sheet 5        delete "5 of 6"     insert --5 of 7--
Drawg. sheet 6        delete "6 of 6"     insert --6 of 7--
Col. 1, line 26       delete "fop"        insert --for--
        line 53       delete "sexy"       insert --say--
        line 54       delete ""t","
Col. 2, line 63       delete "a", 2nd occur.
Col. 3, line 41       delete "thereinby"  insert --therein by--
        line 62       delete "is"         insert --are--
Col. 4, line 3        delete "vocablulary" insert --vocabulary--
Col. 5, line 19       delete "512"        insert --520--
        line 34       delete "a"          insert --an--
        line 58       delete "Junction"   insert --junction--
Col. 6, line 9        delete "chose"      insert --choose--
```

Signed and Sealed this

Fifth Day of September, 2000

Attest:

Q. TODD DICKINSON

Attesting Officer         Director of Patents and Trademarks